(12) United States Patent
Nakayama et al.

(10) Patent No.: US 12,005,635 B2
(45) Date of Patent: Jun. 11, 2024

(54) THREE-DIMENSIONAL SHAPING DEVICE AND THREE-DIMENSIONAL SHAPING METHOD

(71) Applicant: IHI Corporation, Tokyo (JP)

(72) Inventors: Yuichiro Nakayama, Tokyo (JP); Daiki Hayashi, Tokyo (JP)

(73) Assignee: IHI CORPORATION, Tokyo (JP)

( * ) Notice: Subject to any disclaimer, the term of this patent is extended or adjusted under 35 U.S.C. 154(b) by 144 days.

(21) Appl. No.: 16/644,916

(22) PCT Filed: Sep. 3, 2018

(86) PCT No.: PCT/JP2018/032642
§ 371 (c)(1),
(2) Date: Mar. 5, 2020

(87) PCT Pub. No.: WO2019/049832
PCT Pub. Date: Mar. 14, 2019

(65) Prior Publication Data
US 2020/0262137 A1    Aug. 20, 2020

(30) Foreign Application Priority Data

Sep. 6, 2017  (JP) .................. 2017-171293

(51) Int. Cl.
*B29C 64/153*  (2017.01)
*B29C 64/227*  (2017.01)
(Continued)

(52) U.S. Cl.
CPC .......... *B29C 64/153* (2017.08); *B29C 64/227* (2017.08); *B29C 64/245* (2017.08);
(Continued)

(58) Field of Classification Search
CPC ... B29C 64/153; B29C 64/227; B29C 64/245; B29C 64/268; B29C 64/314;
(Continued)

(56) References Cited

U.S. PATENT DOCUMENTS

2006/0157454 A1   7/2006   Larsson
2010/0007062 A1   1/2010   Larsson et al.
(Continued)

FOREIGN PATENT DOCUMENTS

CN   101479064 A   7/2009
CN   104972119 A   10/2015
(Continued)

*Primary Examiner* — Seyed Masoud Malekzadeh
*Assistant Examiner* — Xinwen Ye
(74) *Attorney, Agent, or Firm* — Volpe Koenig

(57) ABSTRACT

A three-dimensional shaping device shapes a three-dimensional article by irradiating a powder material with an electron beam and melting the powder material. The three-dimensional shaping device includes an electron beam emitting unit emitting the electron beam, melting the powder material in order to shape the article, and performing preliminary heating of the powder material by irradiating the powder material with the electron beam before the article is shaped. The electron beam emitting unit moves an irradiation position of the electron beam in a spiral pattern when the powder material is irradiated with the electron beam for preliminary heating.

4 Claims, 7 Drawing Sheets

(51) Int. Cl.
  *B29C 64/245* (2017.01)
  *B29C 64/268* (2017.01)
  *B29C 64/314* (2017.01)
  *B33Y 10/00* (2015.01)
  *B33Y 30/00* (2015.01)
  *B33Y 40/10* (2020.01)

(52) U.S. Cl.
  CPC .......... *B29C 64/268* (2017.08); *B29C 64/314* (2017.08); *B33Y 10/00* (2014.12); *B33Y 30/00* (2014.12); *B33Y 40/10* (2020.01)

(58) Field of Classification Search
  CPC ......... B33Y 10/00; B33Y 30/00; B33Y 40/10; B22F 10/28; B22F 10/362; B22F 10/366; B22F 12/30; B22F 2203/11; Y02P 10/25; B23K 15/002; B23K 15/0033; B23K 15/0086
  USPC ........................................................ 264/497
  See application file for complete search history.

(56) References Cited

U.S. PATENT DOCUMENTS

| | | |
|---|---|---|
| 2010/0163405 A1 | 7/2010 | Ackelid |
| 2012/0211926 A1 | 8/2012 | Larsson et al. |
| 2012/0234671 A1 | 9/2012 | Ackelid |
| 2013/0300035 A1 | 11/2013 | Snis |
| 2014/0163717 A1 | 6/2014 | Das et al. |
| 2014/0370323 A1 | 12/2014 | Ackelid |
| 2015/0283761 A1 | 10/2015 | Maeda et al. |
| 2015/0283762 A1 | 10/2015 | Maeda et al. |
| 2016/0067820 A1* | 3/2016 | Mironets ............... B33Y 30/00 219/76.12 |
| 2016/0167160 A1* | 6/2016 | Hellestam ............... B28B 1/001 419/7 |
| 2016/0167303 A1 | 6/2016 | Petelet |
| 2018/0065179 A1* | 3/2018 | Goto ..................... B22F 10/20 |
| 2018/0311760 A1* | 11/2018 | El Naga ............... B22F 10/366 |
| 2020/0398341 A1 | 12/2020 | Hellestam |

FOREIGN PATENT DOCUMENTS

| | | | |
|---|---|---|---|
| CN | 104972120 A | 10/2015 | |
| CN | 105163894 A | 12/2015 | |
| CN | 107107469 A | 8/2017 | |
| EP | 3196001 A1 * | 7/2017 | ............ B33Y 10/00 |
| EP | 3196001 A1 | 7/2017 | |
| EP | 3223299 A1 | 9/2017 | |
| JP | 2006-513055 A | 4/2006 | |
| JP | 2009-544501 A | 12/2009 | |
| JP | 2010-526694 A | 8/2010 | |
| JP | 5108884 B2 | 12/2012 | |
| JP | 2015-507092 A | 3/2015 | |
| JP | 5712306 B2 | 5/2015 | |
| JP | 2016-502603 A | 1/2016 | |
| JP | 2016-522761 A | 8/2016 | |
| KR | 10-2013-0100491 A | 9/2013 | |
| WO | 2008/013483 A1 | 1/2008 | |
| WO | 2014/074947 A2 | 5/2014 | |
| WO | 2014/176536 A1 | 10/2014 | |
| WO | 2017/126073 A1 | 7/2017 | |
| WO | WO-2017137391 A1 * | 8/2017 | ............ B22F 10/20 |

\* cited by examiner

THREE-DIMENSIONAL SHAPING DEVICE AND THREE-DIMENSIONAL SHAPING METHOD

TECHNICAL FIELD

The present disclosure describes a three-dimensional shaping device shaping a three-dimensional article, and a three-dimensional shaping method.

BACKGROUND ART

In the related art, regarding a three-dimensional shaping device and a three-dimensional shaping method, for example, the device and the method disclosed in Japanese Patent No. 5108884 are known. In the device and the method, a powder material is melted by irradiating the powder material with an electron beam. Thereafter, the powder material is solidified, and thus a three-dimensional article is shaped. In the device and the method, a powder material is preheated by irradiating the powder material with an electron beam before melting and solidifying the powder material. Further, in the device and the method, when this preheating is performed, in order to curb influence of electric charges accumulated due to irradiation of an electron beam, scanning paths of the electron beam are set away from each other by a predetermined distance. Further, in the device and the method, electron beam scanning is performed along the scanning paths.

CITATION LIST

Patent Literature

Patent Literature 1: Japanese Patent No. 5108884
Patent Literature 2: Japanese Unexamined Patent Publication No. 2006-513055
Patent Literature 3: Japanese Unexamined Patent Publication No. 2010-526694
Patent Literature 4: Japanese Unexamined Patent Publication No. 2015-507092
Patent Literature 5: Japanese Patent No. 5712306

SUMMARY OF INVENTION

Technical Problem

However, in such a three-dimensional shaping device and a three-dimensional shaping method, it is difficult to uniformly heat a powder material when the powder material is preheated. FIG. 5 illustrates an example in which an irradiation position of an electron beam is moved in a certain direction, and when the irradiation position reaches an end portion of an irradiation region, the irradiation position returns to a position in the other end portion and irradiation of an electron beam is performed again in a certain direction. In this case, a response delay of an electron beam may occur at a turning part of the electron beam. For this reason, it is difficult to perform irradiation of an electron beam as it is set in advance. In addition, in the device and the method described above, there is also concern that there may be a part which is not irradiated with an electron beam. Moreover, in the device and the method described above, there is also concern that there may be a part which is excessively irradiated with an electron beam. For these reasons, an uneven heat input that is a heat quantity which has not been uniformly input occurs in a powder material. Therefore, in the device and the method described above, appropriate preliminary heating of a powder material cannot be performed.

The present disclosure describes a three-dimensional shaping device and a three-dimensional shaping method, in which preliminary heating of a powder material can be performed appropriately.

Solution to Problem

According to the present disclosure, there is provided a three-dimensional shaping device shaping a three-dimensional article by irradiating a powder material with an electron beam and melting the powder material. The three-dimensional shaping device includes an electron beam emitting unit emitting the electron beam, melting the powder material in order to shape the article, and performing preliminary heating of the powder material by irradiating the powder material with the electron beam before the article is shaped. The electron beam emitting unit is constituted to move an irradiation position of the electron beam in a spiral pattern when the powder material is irradiated with the electron beam for preliminary heating.

According to the present disclosure, there is provided a three-dimensional shaping method for shaping a three-dimensional article by irradiating a powder material with an electron beam and melting the powder material. The three-dimensional shaping method includes a preliminary heating step of performing preliminary heating of the powder material by irradiating the powder material with the electron beam before the article is shaped by irradiating the powder material with the electron beam. In this preliminary heating step, an irradiation position of the electron beam is moved in a spiral pattern when the powder material is irradiated with the electron beam.

Effects of Invention

According to the three-dimensional shaping device and the three-dimensional shaping method of the present disclosure, preliminary heating of a powder material can be performed appropriately.

DESCRIPTION OF EMBODIMENT

Figure 1:
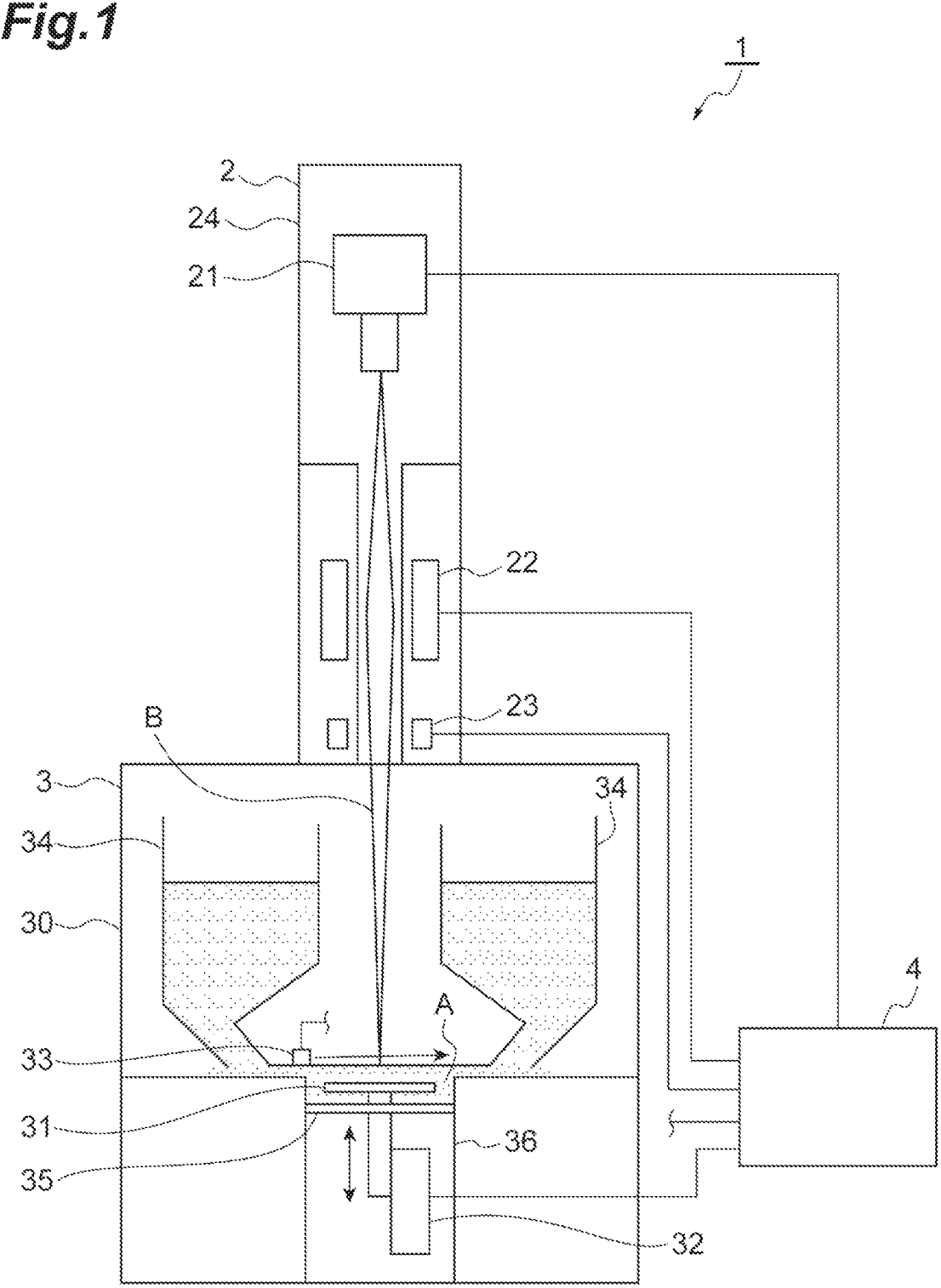
FIG. 1 is a schematic view illustrating a constitution of a three-dimensional shaping device according to the present disclosure.

Hereinafter, a three-dimensional shaping device and a three-dimensional shaping method according to the present disclosure will be described with reference to the drawings. The same reference signs are applied to the same elements in description of the drawings, and duplicate description will be omitted.

According to the present disclosure, there is provided a three-dimensional shaping device shaping a three-dimensional article by irradiating a powder material with an electron beam and melting the powder material. The three-dimensional shaping device includes an electron beam emitting unit emitting the electron beam, melting the powder material in order to shape the article, and performing preliminary heating of the powder material by irradiating the powder material with the electron beam before the article is shaped. The electron beam emitting unit is constituted to move an irradiation position of the electron beam in a spiral pattern when the powder material is irradiated with the electron beam for preliminary heating. According to this three-dimensional shaping device, the irradiation position of the electron beam can be moved without being steeply changed and preliminary heating of an irradiation region can be performed by moving the irradiation position of the electron beam in a spiral pattern when preliminary heating is performed. For this reason, a response delay is unlikely to occur in movement of the irradiation position of the electron beam. Therefore, an uneven heat input in the powder material can be curbed.

In the three-dimensional shaping device according to the present disclosure, the electron beam emitting unit may move the irradiation position of the electron beam in a spiral pattern from a center toward an outer edge of an irradiation region when the powder material is irradiated with the electron beam for preliminary heating. In this case, since the irradiation position of the electron beam is moved in a spiral pattern from the center toward the outer edge of the irradiation region, when the irradiation position of the electron beam returns from the outer edge of the irradiation region to the center of the irradiation region again, the irradiation position of the electron beam can be moved to an irradiation position in the vicinity of the center without being steeply changed. For this reason, a response delay is unlikely to occur in movement of the irradiation position of the electron beam. Therefore, an uneven heat input in the powder material can be curbed.

In the three-dimensional shaping device according to the present disclosure, when irradiation of the electron beam is performed along a plurality of irradiation paths for preliminary heating, a path region in the vicinity of a start point of the irradiation paths may be formed in a direction from an end point of a preceding irradiation region toward the start point. In this case, when irradiation of the electron beam is performed successively from a preceding irradiation path to a next irradiation path, irradiation of the electron beam is easily performed as it is set along the next irradiation path.

The three-dimensional shaping device according to the present disclosure may further include a plate for placing the powder material and supporting the article to be shaped. This plate may be formed to have a circular shape. In this case, since the plate is formed to have a circular shape, the irradiation region irradiated with the electron beam for preliminary heating has a circular shape. For this reason, irradiation of the electron beam can be performed in a circumferential direction of the irradiation region by performing irradiation of the electron beam in a spiral pattern. Therefore, preliminary heating of the irradiation region can be performed efficiently.

In the three-dimensional shaping device according to the present disclosure, the electron beam emitting unit may perform preliminary heating of the plate by irradiating the plate with the electron beam in a spiral pattern before preliminary heating of the powder material is performed. In this case, the plate can be heated in advance, and thus preliminary heating of the plate can be performed efficiently by performing irradiation of the electron beam in a spiral pattern.

According to the present disclosure, there is provided a three-dimensional shaping method for shaping a three-dimensional article by irradiating a powder material with an electron beam and melting the powder material. The three-dimensional shaping method includes a preliminary heating step of performing preliminary heating of the powder material by irradiating the powder material with the electron beam before the article is shaped by irradiating the powder material with the electron beam. In this preliminary heating step, an irradiation position of the electron beam is moved in a spiral pattern when the powder material is irradiated with the electron beam. According to this three-dimensional shaping method, the irradiation position of the electron beam can be moved without being steeply changed and preliminary heating of an irradiation region can be performed by moving the irradiation position of the electron beam in a spiral pattern when preliminary heating is performed. For this reason, a response delay is unlikely to occur in movement of the irradiation position of the electron beam. Therefore, an uneven heat input in the powder material can be curbed.

FIG. 1 is a schematic view illustrating a constitution of the three-dimensional shaping device according to the present disclosure. A three-dimensional shaping device 1 melts a powder material A by irradiating the powder material A with an electron beam B. Thereafter, the three-dimensional shaping device 1 shapes a three-dimensional article by solidifying the powder material A. The three-dimensional shaping device 1 includes an electron beam emitting unit 2, a shaping unit 3, and a control unit 4.

The electron beam emitting unit 2 emits the electron beam B to the powder material A in the shaping unit 3. As a result of emission of the electron beam B, the powder material A is melted. In addition, the electron beam emitting unit 2 irradiates the powder material A with the electron beam B before the article is shaped. As a result, preliminary heating of the powder material A is performed. At this time, the electron beam emitting unit 2 moves the irradiation position of the electron beam B in a spiral pattern when the powder material A is irradiated with the electron beam B for preliminary heating. For example, irradiation of the electron beam B is performed along a spiral irradiation path from the center toward the outer edge of the irradiation region of the electron beam B. The irradiation path of the electron beam B may be a single spiral path. In addition, the irradiation path of the electron beam B may include a plurality of spiral paths. In this manner, the irradiation position of the electron beam B is no longer steeply changed by moving the irradiation position of the electron beam B in a spiral pattern when preliminary heating is performed. As a result, preliminary heating of the irradiation region can be performed while the irradiation position of the electron beam B is moved such that the irradiation position of the electron beam B is not steeply changed. For this reason, a response delay can be unlikely to occur in movement of the irradiation position of the electron beam B. Moreover, an uneven heat input in the powder material A can be curbed.

The electron beam emitting unit 2 includes an electron gun portion 21, a convergent coil 22, and a deflection coil 23. The electron gun portion 21 is electrically connected to the control unit 4. The electron gun portion 21 operates upon reception of a control signal from the control unit 4. The electron gun portion 21 emits the electron beam B. For example, the electron gun portion 21 emits the electron beam B downward. The convergent coil 22 is electrically connected to the control unit 4. The convergent coil 22 operates upon reception of a control signal from the control unit 4. The convergent coil 22 is installed around the electron beam B emitted from the electron gun portion 21. The convergent coil 22 causes the electron beam B to converge. The deflection coil 23 is electrically connected to the control unit 4. The deflection coil 23 operates upon reception of a control signal from the control unit 4. The deflection coil 23 is installed around the electron beam B emitted from the electron gun portion 21. The deflection coil 23 adjusts the irradiation position of the electron beam B in accordance with a control signal. The deflection coil 23 performs electromagnetic beam deflection. Therefore, the deflection coil 23 can make a scanning speed at the time of irradiation of the electron beam B faster than that of mechanical beam deflection. The electron gun portion 21, the convergent coil 22, and the deflection coil 23 are installed inside a column 24 exhibiting a tubular shape, for example.

The shaping unit 3 is a part shaping a desired article. In the shaping unit 3, the powder material A is disposed inside a chamber 30. The shaping unit 3 includes a plate 31, an elevator 32, a rake 33, and a hopper 34 inside the chamber 30. The plate 31 supports an article to be molded. Since an article is shaped on the plate 31, the plate 31 supports an article to be molded. For example, the plate 31 is a circular plate-shaped body. The plate 31 is disposed on an extending line in an emitting direction of the electron beam B. For example, the plate 31 is provided toward a horizontal direction. The plate 31 is supported by an elevating stage 35 installed below the plate 31. The plate 31 moves in an up-down direction together with the elevating stage 35. The elevator 32 elevates the plate 31. The elevator 32 is electrically connected to the control unit 4. The elevator 32 operates upon reception of a control signal from the control unit 4. For example, the elevator 32 moves the plate 31 upward together with the elevating stage 35 in an initial stage of shaping of an article. The elevator 32 moves the plate 31 downward every time the powder material A is laminated through melting and solidifying of the powder material A on the plate 31. A structure of the elevator 32 need only be able to elevate the plate 31, and the structure is not particularly limited. The plate 31 is disposed inside a shaping tank 36. For example, the shaping tank 36 is formed to have a cylindrical shape. The shaping tank 36 extends in a moving direction of the plate 31. A cross section of the shaping tank 36 is a circular cross section having a circular shape concentric with the plate 31. The elevating stage 35 corresponds to an inner shape of the shaping tank 36. That is, when the inner shape of the shaping tank 36 is a circular shape in a horizontal cross section, the external shape of the elevating stage 35 is also a circular shape. Accordingly, the powder material A supplied to the shaping tank 36 is unlikely to leak downward from the elevating stage 35. In addition, in order to curb downward leakage of the elevating stage 35 from the powder material A, a seal material may be provided in an outer edge portion of the elevating stage 35. The shape of the shaping tank 36 is not limited to a cylindrical shape. The shape of the shaping tank 36 may be a quadrangular tube shape having a rectangular cross section.

The rake 33 levels the powder material A disposed above the plate 31. For example, a member having a rod shape or a plate shape is used as the rake 33. The rake 33 levels the surface of the powder material A by moving the members in the horizontal direction. The rake 33 is moved by an actuator and a mechanism (not illustrated). A mechanism other than the rake 33 can be used as a mechanism for leveling the powder material A. The hopper 34 accommodates the powder material A. A discharge port for discharging the powder material A is formed in a lower portion of the hopper 34. The powder material A which has been discharged through the discharge port flows into a part on the plate 31. Alternatively, the powder material A which has been discharged through the discharge port is supplied to a part on the plate 31 by the rake 33. The plate 31, the elevator 32, the rake 33, and the hopper 34 are installed inside the chamber 30. The inside of the chamber 30 is in a vacuum state or is substantially in a vacuum state. Mechanisms other than the rake 33 and the hopper 34 can be used as mechanisms for supplying the powder material A to a part on the plate 31 in a layered shape.

The powder material A is constituted of a number of powder bodies. For example, a metal powder is used as the powder material A. In addition, the powder material A need only be able to be melted and solidified by irradiation of the electron beam B, and grains having a larger grain size than a powder may be used.

The control unit 4 is an electronic control unit controlling the three-dimensional shaping device 1 in its entirety. For example, the control unit 4 is a computer including a CPU, a ROM, and a RAM. The control unit 4 executes elevating control of the plate 31, operation control of the rake 33, emitting control of the electron beam B, and operation control of the deflection coil 23. Regarding elevating control of the plate 31, the control unit 4 operates the elevator 32 by outputting a control signal to the elevator 32. With this operation, a vertical position of the plate 31 is adjusted. Regarding operation control of the rake 33, the control unit 4 operates the rake 33 before the electron beam B is emitted. With this operation, the powder material A on the plate 31 is leveled. Regarding emitting control of the electron beam B, the control unit 4 outputs a control signal to the electron gun portion 21. Based on this control signal, the electron beam B is emitted from the electron gun portion 21.

Regarding operation control of the deflection coil 23, the control unit 4 outputs a control signal to the deflection coil 23. Based on this control signal, the irradiation position of the electron beam B is controlled. For example, three-dimensional computer-aided design (CAD) data of an article to be shaped is input to the control unit 4. The control unit 4 generates two-dimensional slice data based on this three-dimensional CAD data. For example, the slice data is data of a horizontal cross section of an article to be shaped. The slice data is an aggregate of a number of pieces of data corresponding to positions in the up-down direction. Based on this slice data, the control unit 4 determines a region of the powder material A to be irradiated with the electron beam B. Further, the control unit 4 outputs a control signal to the deflection coil 23 in accordance with a determined region.

The control unit 4 controls preliminary heating in which the powder material A is preheated. The control unit 4 controls preliminary heating before the electron beam B for shaping an article is emitted. Preliminary heating is also referred to as preheating. Preliminary heating is processing in which the powder material A is heated and the temperature of the powder material A is set to a temperature lower than a melting point of the powder material A before the powder material A is melted. Due to this preliminary heating, accumulation of negative electric charges in the powder material A due to irradiation of the electron beam B is curbed. As a result, a smoke phenomenon in which the powder material A is blown upward at the time of irradiation of the electron beam B can be curbed. Regarding control of preliminary heating, the powder material A on the plate 31 is irradiated with the electron beam B. As a result, the powder material A and the plate 31 are heated. At this time, irradiation of the electron beam B for preliminary heating is also required to be performed appropriately. That is, as a reason therefor, there is concern that an article may not be able to be shaped appropriately when there is an uneven heat input in the powder material A or the plate 31 during preliminary heating. That is, during preliminary heating, preliminary heating is required to be performed with a heat input as uniform as possible with respect to the irradiation region of the electron beam B for shaping an article.

Figure 7:
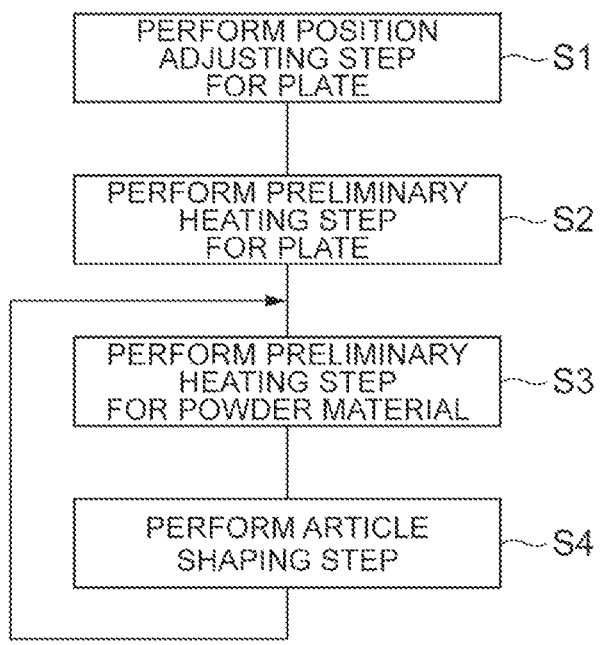
FIG. 7 is a flowchart showing the three-dimensional shaping method.

Next, with reference to FIG. 7, a three-dimensional shaping method according to the present disclosure will be described.

The three-dimensional shaping method according to the present disclosure uses the three-dimensional shaping device 1 described above. First, in FIG. 1, a position adjusting step S1 for the plate 31 is performed. In the initial stage of shaping of an article, the plate 31 is disposed at a position above. The control unit 4 outputs a control signal to the elevator 32. As a result, the elevator 32 is operated, and thus the plate 31 is disposed at a predetermined height. Further, a preliminary heating step S2 for the plate 31 is performed. The control unit 4 outputs control signals to the electron gun portion 21, the convergent coil 22, and the deflection coil 23. As a result, the electron beam B is emitted from the electron gun portion 21, and therefore the plate 31 is irradiated with the electron beam B. Accordingly, the plate 31 is heated before an article is shaped. At this time, for example, irradiation of the electron beam B is performed such that the irradiation position of the electron beam B moves in a spiral pattern. Irradiation at this time may be performed in a manner similar to that in preliminary heating (which will be described below) of the powder material A. At this time, irradiation of the electron beam B may be performed along a plurality of irradiation paths (refer to FIG. 2). In addition, irradiation of the electron beam B may be performed along a single irradiation path (refer to FIG. 4). In addition, the entire area of the plate 31 may be irradiated with the electron beam B only once. Moreover, the entire area of the plate 31 may be repeatedly irradiated with the electron beam B a plurality of times. Preliminary heating of the plate 31 may be performed by a method different from the irradiation of the electron beam B described above. For example, preliminary heating may be performed by repeatedly performing scanning of the plate 31 with the electron beam B in one direction. The preliminary heating step S2 for the plate 31 may be omitted.

Next, a preliminary heating step S3 for the powder material A is performed. The control unit 4 outputs control signals to the electron gun portion 21, the convergent coil 22, and the deflection coil 23. As a result, the electron beam B is emitted from the electron gun portion 21, and therefore the powder material A on the plate 31 is irradiated with the electron beam B. Accordingly, the powder material A is heated before an article is shaped. Due to this heating, the powder material A is temporarily sintered, for example. As a result, the powder material A is in a state where it does not scatter easily.

At this time, the irradiation position of the electron beam B moves in a spiral pattern when the powder material A is irradiated with the electron beam B. That is, the powder material A is irradiated with the electron beam B by moving the irradiation position in a spiral pattern.

Figure 2:
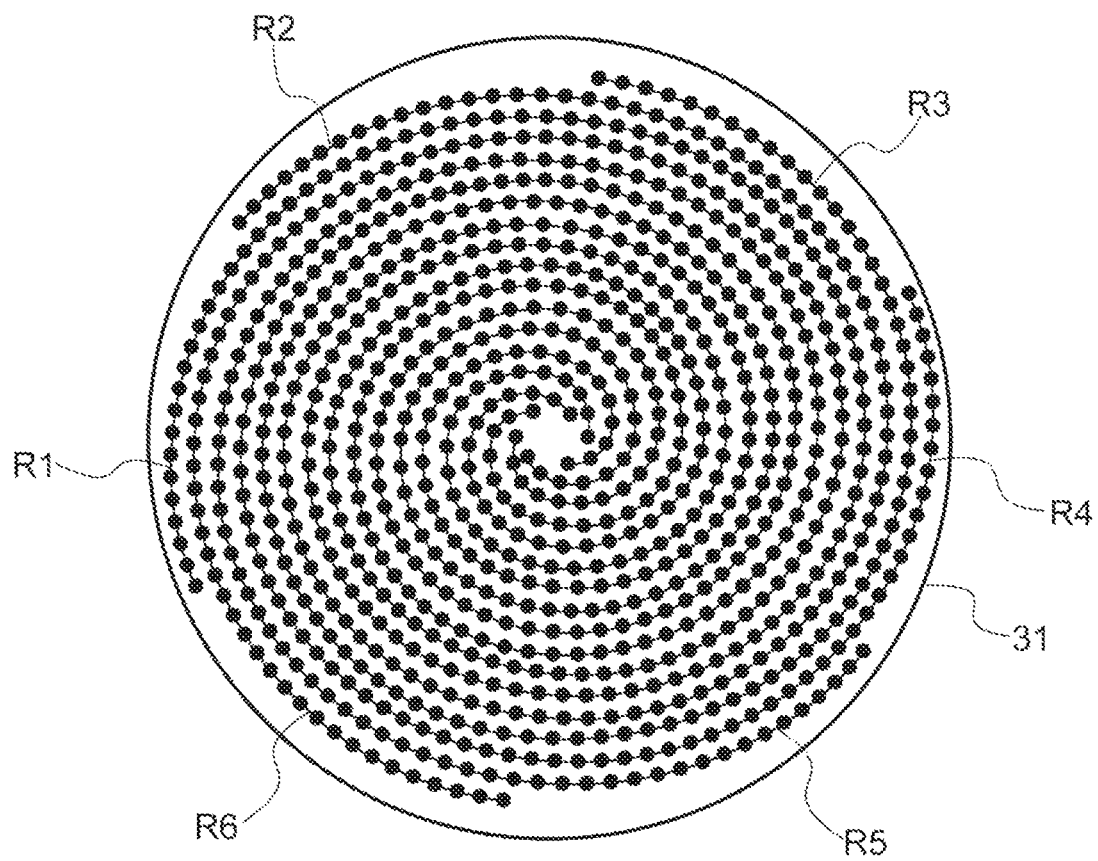
FIG. 2 is an explanatory view of an irradiation path of an electron beam in a three-dimensional shaping method according to the present disclosure.
Figure 3:
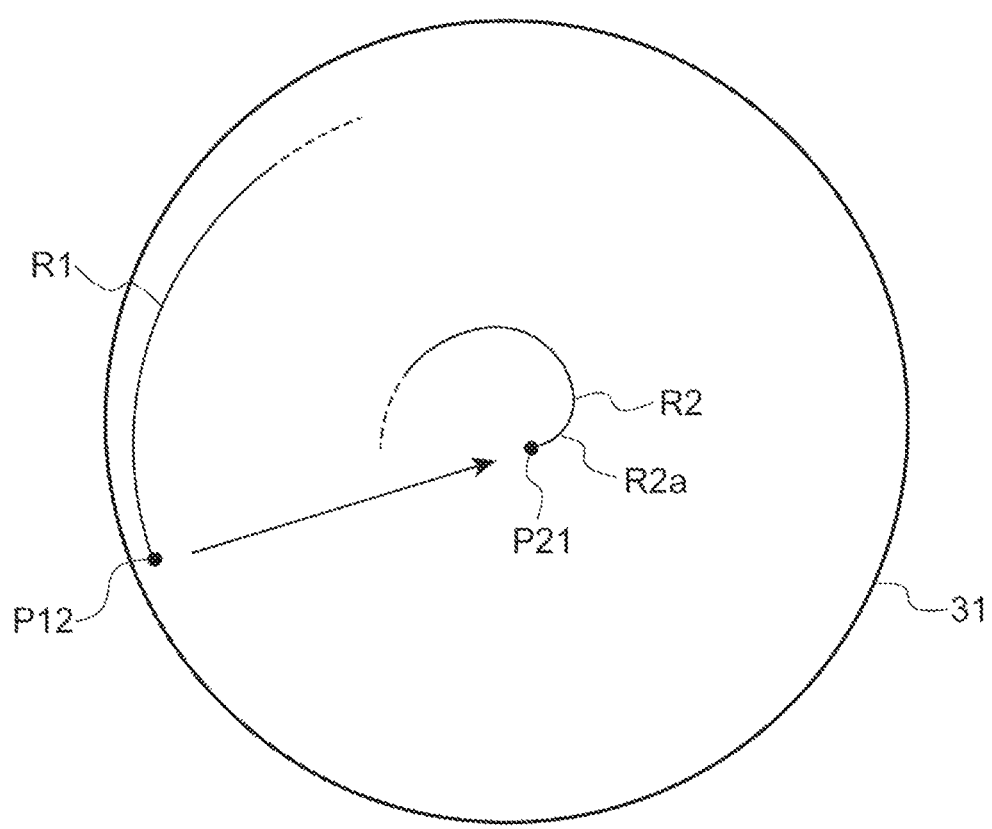
FIG. 3 is an explanatory view of another irradiation path of an electron beam in the three-dimensional shaping method according to the present disclosure.
Figure 4:
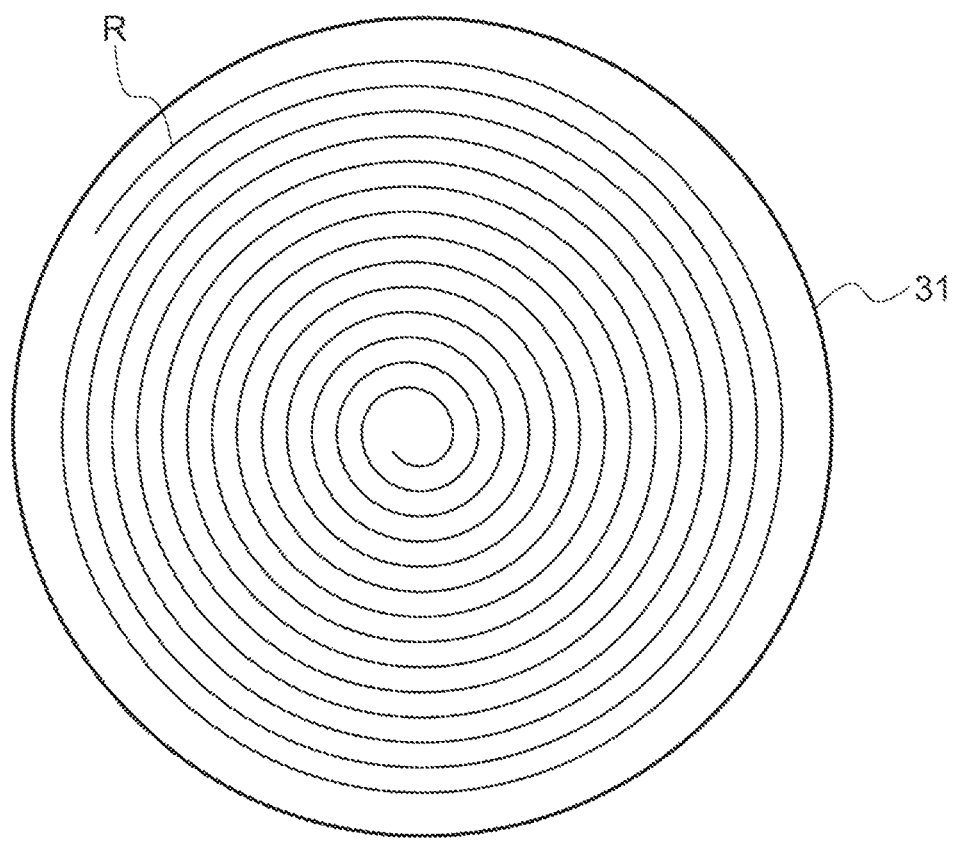
FIG. 4 is an explanatory view of another irradiation path of an electron beam in the three-dimensional shaping method according to the present disclosure.

FIGS. 2, 3, and 4 illustrate movement paths of the irradiation position of the electron beam B. In FIGS. 2, 3, and 4, a part (irradiation region) on the circular plate 31 is irradiated with the electron beam B. In FIGS. 2, 3, and 4, for the sake of convenience of description, illustration of the powder material A is omitted. As illustrated in FIG. 2, irradiation of the electron beam B is performed along a spiral irradiation path R1 from the center toward the outer edge of the irradiation region. Next, irradiation of the electron beam B is performed along a spiral irradiation path R2 from the center toward the outer edge of the irradiation region.

Moreover, irradiation of the electron beam B is performed in a spiral pattern from the center toward the outer edge of the irradiation region in the order of the irradiation paths R3, R4, R5, and R6 subsequent to the irradiation path R2. The irradiation paths R1, R2, R3, R4, R5, and R6 are paths having the same shapes. The irradiation paths R1, R2, R3, R4, R5, and R6 have concentric shapes. Moreover, the irradiation paths R1, R2, R3, R4, R5, and R6 are set to positions shifted by sixty degrees in the circumferential direction from the center of the irradiation region. Gap distances between the paths in the irradiation paths R1, R2, R3, R4, R5, and R6 are the same or substantially the same as each other. Black dots on the irradiation paths R1, R2, R3, R4, R5, and R6 indicate the irradiation positions of the electron beam B.

In this manner, preliminary heating of the irradiation region can be performed without steeply moving the irradiation position of the electron beam B by performing irradiation while the electron beam B is moved in a spiral pattern. For this reason, a response delay is unlikely to occur in movement of the irradiation position of the electron beam B. As a result, an uneven heat input in the powder material A can be curbed. In addition, when irradiation is performed by moving the electron beam B in a spiral pattern, the irradiation path can be set to be longer than that in a case where irradiation is performed by linearly moving the electron beam B. For this reason, the number of times of setting the irradiation path can be reduced. As a result, succession from an irradiation path to a next irradiation path can be reduced. For this reason, it is possible to reduce an uneven heat input due to a shift of the irradiation position of the electron beam B during succession from an irradiation path to a next irradiation path.

In addition, the circular plate 31 is irradiated with the electron beam B by moving the electron beam B in a spiral pattern. As a result, with respect to the circular irradiation region set on the plate 31, an irradiation path of the electron beam B can be set along the outer edge thereof. For this reason, it is possible to avoid turning of the irradiation position of the electron beam B by 180 degrees during succession from an irradiation path to a next irradiation path. Therefore, succession from an irradiation path to a next irradiation path can be performed smoothly. As a result, it is possible to reduce an uneven heat input due to a shift of the irradiation position of the electron beam B during succession from an irradiation path to a next irradiation path.

As illustrated in FIG. 3, irradiation of the electron beam B is performed consecutively along the irradiation path R2 after irradiation along the irradiation path R1 has ended. In the irradiation path R2, a path region R2a in the vicinity of a start point P21 is formed in a direction from an end point P12 of the irradiation path R1 toward the start point P21. For this reason, irradiation of the electron beam B is performed as it is set along the irradiation path R2. In contrast, when the path region R2*a* in the vicinity of the start point P21 of the irradiation path R2 is not formed in a direction from the end point P12 of the irradiation path R1 toward the start point P21, the irradiation position of the electron beam B deviates from the irradiation path R2. As a result, it is difficult to perform irradiation of the electron beam B as it is set. That is, a response delay occurs in movement of the irradiation position of the electron beam B. Therefore, an uneven heat input occurs in the powder material A. FIG. 3 illustrates a relationship between the irradiation path R1 and the irradiation path R2. The irradiation path R2 and the irradiation path R3, the irradiation path R3 and the irradiation path R4, the irradiation path R4 and the irradiation path R5, and the irradiation path R5 and the irradiation path R6 are also set to have a similar relationship therebetween. Accordingly, in the entire irradiation region, an uneven heat input in the powder material A can be curbed.

In FIGS. 2 and 3, a case where the irradiation region of the electron beam B is subjected to preliminary heating using six irradiation paths R1, R2, R3, R4, R5, and R6 has been described. The irradiation path of the electron beam B may be a single spiral irradiation path. For example, as illustrated in FIG. 4, preliminary heating may be performed by moving the irradiation position of the electron beam B along one irradiation path R. In addition, the irradiation path of the electron beam B may include two to less than five spiral irradiation paths. In addition, the irradiation path of the electron beam B may include seven or more spiral irradiation paths. Even in such cases, the irradiation position of the electron beam B moves in a spiral pattern when preliminary heating is performed. As a result, preliminary heating of the irradiation region can be performed without steeply moving the irradiation position of the electron beam B. For this reason, a response delay is unlikely to occur in movement of the irradiation position of the electron beam B. Therefore, an uneven heat input in the powder material A can be curbed. Irradiation through the irradiation paths R1, R2, R3, R4, R5, and R6 in FIG. 2 may be performed only once. In addition, irradiation through the irradiation paths R1, R2, R3, R4, R5, and R6 may be repeatedly performed a plurality of times. In addition, irradiation through the irradiation path R in FIG. 4 may also be performed only once. In addition, irradiation through the irradiation path R may be repeatedly performed a plurality of times.

Due to the preliminary heating described above, the powder material A within the circular irradiation region is heated. As a result, the powder material A is in a state where it does not scatter easily. In FIG. 1, after the preliminary heating step S3 ends, an article shaping step S4 is performed. In the article shaping step S4, an article (shaping target) is shaped. The control unit 4 outputs control signals to the electron gun portion 21, the convergent coil 22, and the deflection coil 23. As a result, the electron beam B is emitted from the electron gun portion 21. That is, the powder material A on the plate 31 is irradiated with the electron beam B. Accordingly, the powder material A at the irradiation position is melted and is then solidified, thereby constituting a part of an article. At this time, the powder material A has been subjected to preliminary heating appropriately such that an uneven heat input is curbed in the irradiation region of the electron beam B. As a result, occurrence of a smoke phenomenon is curbed due to irradiation of the electron beam B. In addition, since preliminary heating is performed in this manner, it is possible to achieve an effect of sufficiently reducing residual stress inside an article to be molded.

In the article shaping step S4, the irradiation position of the electron beam B is determined based on the two-dimensional slice data of an article input to the control unit 4 in advance. The control unit 4 outputs a control signal to the elevator 32 after irradiation of the electron beam B is performed based on one piece of two-dimensional slice data. As a result, the elevator 32 operates, and thus the plate 31 moves downward by a predetermined distance. Further, the control unit 4 causes the rake 33 to operate. As a result, after the powder material A is supplied to a part on a solidified article, the surface of the powder material A is leveled in a flat manner.

Further, the control unit 4 executes the foregoing preliminary heating step S3 again. After the preliminary heating step S3 ends, the article shaping step S4 is executed again. In this manner, an article is shaped while the solidified powder material A is laminated by alternately repeating the preliminary heating step S3 and the article shaping step S4.

As described above, according to the three-dimensional shaping device and the three-dimensional shaping method of the present disclosure, the irradiation position of the electron beam B is moved in a spiral pattern when preliminary heating is performed. As a result, preliminary heating of the irradiation region can be performed without steeply moving the irradiation position of the electron beam B. For this reason, a response delay is unlikely to occur in movement of the irradiation position of the electron beam. Therefore, an uneven heat input in the powder material A can be curbed.

Figure 5:
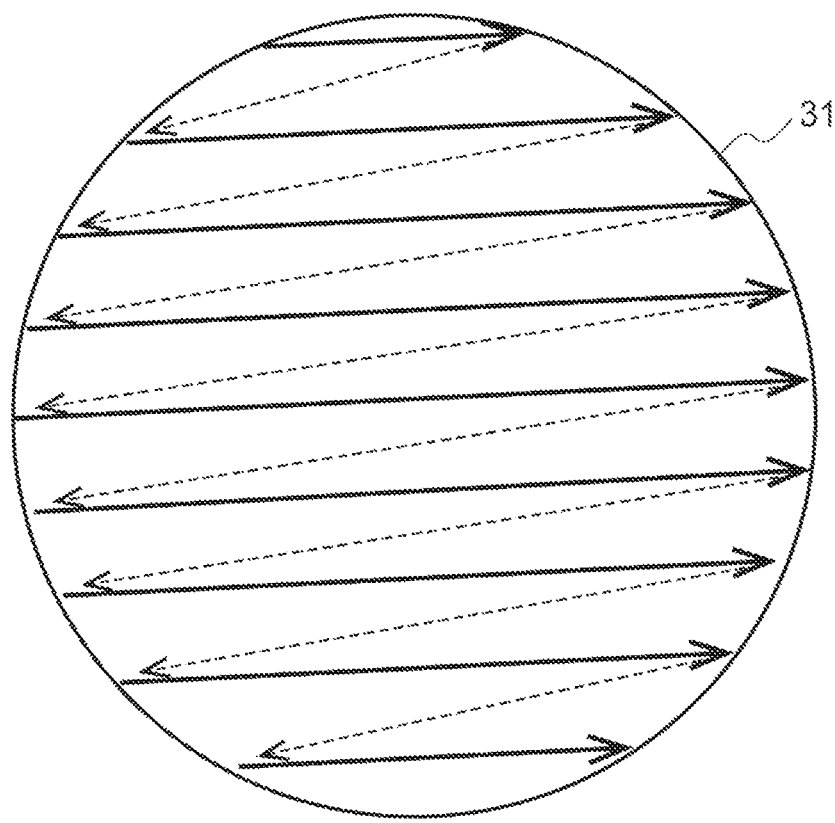
FIG. 5 is an explanatory view of an irradiation path of a comparative example in the three-dimensional shaping method.
Figure 6:
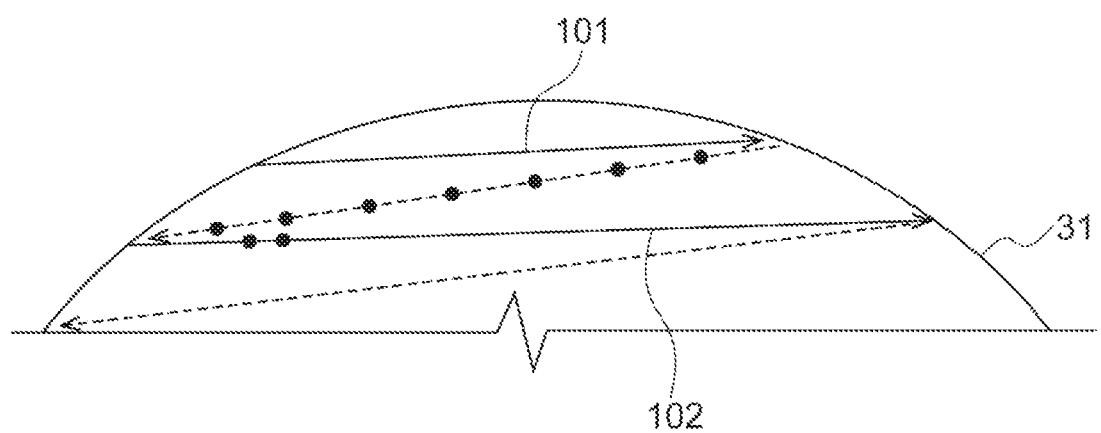
FIG. 6 is an explanatory view of the irradiation path of the comparative example in the three-dimensional shaping method.

For example, as illustrated in FIG. 5, it is conceivable that the irradiation position of the electron beam B be moved in a certain direction during preliminary heating, and after the irradiation position reaches an end portion of the irradiation region, the irradiation position returns to a position in the other end portion and irradiation is performed again in a certain direction. In this case, as illustrated in FIG. 6, in a turning region of an irradiation path 102 from an irradiation path 101, there is concern that the irradiation position of the electron beam B may deviate from the set irradiation path 102. This is because the electron beam B cannot sufficiently follow the movement due to the influence of a response delay of the deflection coil 23, whereas steep movement of the electron beam B is required in the turning region. As a countermeasure thereof, it is conceivable that the scanning speed of the electron beam B be set to be low. However, when the scanning speed is set to be low, a shaping speed of the article decelerates. As a result, shaping of an article requires a long period of time. In contrast, in the three-dimensional shaping device and the three-dimensional shaping method according to the present disclosure, the irradiation position of the electron beam B is moved in a spiral pattern when preliminary heating is performed. As a result, steep movement of the irradiation position of the electron beam B is curbed. Accordingly, occurrence of a response delay in movement of the irradiation position of the electron beam B is curbed. Therefore, an uneven heat input in the powder material A can be curbed.

In the three-dimensional shaping device and the three-dimensional shaping method according to the present disclosure, when the powder material A is irradiated with the electron beam B for preliminary heating, the irradiation position of the electron beam B is moved in a spiral pattern from the center toward the outer edge of the irradiation region. Accordingly, when the irradiation position of the electron beam B returns from the outer edge of the irradiation region to the center of the irradiation region again, the irradiation position of the electron beam B can be moved to the irradiation position in the vicinity of the center without steeply changing the irradiation position of the electron beam B. For this reason, a response delay is unlikely to occur in movement of the irradiation position of the electron beam B. Therefore, an uneven heat input in the powder material A can be curbed.

For example, as illustrated in FIG. 3, when the irradiation position of the electron beam B is moved in a spiral pattern from the center toward the outer edge of the irradiation region, the path region R2a in the vicinity of the start point P21 on the center side is easily formed in a direction from the end point P12 on the outer edge side toward the start point P21 on the center side. For this reason, when the irradiation position of the electron beam B returns from the end point P12 on the outer edge side to the start point P21 on the center side, irradiation of the electron beam B is performed as it is set along the irradiation path R2. Accordingly, an uneven heat input in the powder material A can be curbed when preliminary heating is performed. In FIG. 3, a case where preliminary heating is performed using a plurality of irradiation paths has been described. However, similarly in the case where preliminary heating is performed using a single irradiation path as in FIG. 4, irradiation of the electron beam B is performed as it is set along the irradiation path R2. Therefore, an uneven heat input in the powder material A can be curbed when preliminary heating is performed.

In the three-dimensional shaping device and the three-dimensional shaping method according to the present disclosure, in a case of performing irradiation of the electron beam B along a plurality of irradiation paths for preliminary heating, a path region in the vicinity of the start point of the irradiation path is formed in a direction from the end point of a preceding irradiation region toward the start point. For this reason, when irradiation of an electron beam is performed successively from a preceding irradiation path to a next irradiation path, irradiation of an electron beam is easily performed as it is set along the next irradiation path. Therefore, an uneven heat input in the powder material A can be curbed when preliminary heating is performed.

According to the three-dimensional shaping device and the three-dimensional shaping method of the present disclosure, the plate 31 is formed to have a circular shape. As a result, the irradiation region irradiated with the electron beam B for preliminary heating has a circular shape. For this reason, irradiation of an electron beam can be performed in the circumferential direction of the irradiation region by performing irradiation of the electron beam B in a spiral pattern. For this reason, preliminary heating of the irradiation region can be performed efficiently.

The three-dimensional shaping device and the three-dimensional shaping method according to the present disclosure is not limited to the embodiment described above. The three-dimensional shaping device and the three-dimensional shaping method according to the present disclosure may employ various modified forms within a range not departing from the gist disclosed in the claims.

For example, in the embodiment described above, a case where irradiation of the electron beam B is performed in a spiral pattern when preliminary heating of the plate 31 and the powder material A is performed has been described. However, irradiation of the electron beam B may be performed in a spiral pattern when preliminary heating of the plate 31 is performed, and irradiation of the electron beam B may be performed through irradiation other than spiral irradiation when preliminary heating of the powder material A is performed. Examples of such irradiation of the electron beam B include a form in which irradiation of the electron beam B is repeatedly performed in one direction. Even in this case as well, an uneven heat input of preliminary heating of the plate 31 is curbed, and thus preliminary heating can be performed appropriately.

In addition, in the embodiment described above, a case where the electron beam emitting unit 2 includes one electron gun portion 21 has been described. However, the electron beam emitting unit 2 may include a plurality of electron gun portions. In this case, a plurality of electron beams B can be emitted from the electron beam emitting unit 2. As a result, preliminary heating of the powder material A and the plate 31 and shaping of an article can be performed efficiently. Therefore, shaping processing can be performed quickly. In addition, an electron gun portion for performing preliminary heating may be provided separately from an electron gun portion for performing article shaping, and they may operate separately from each other. In this case, there is no need to adjust outputs of the electron gun portions.

In addition, in the embodiment described above, description has been given such that irradiation of the electron beam B is performed in the order of the irradiation paths R1, R2, R3, R4, R5, and R6. However, the embodiment is not limited to this order. For example, even when the irradiation path R3 is selected after the irradiation path R1, the moving direction of the electron beam B in the irradiation path R3 can match the moving direction of the electron beam B in the irradiation path R1 by suitably setting the lengths of outer circumferential portions of the irradiation paths R1, R2, R3, R4, R5, and R6. For example, irradiation of the electron beam B may be performed in the order of the irradiation paths R1, R4, R2, R5, R3, and R6. According to this constitution, for example, a gap between the irradiation path R1 and the irradiation path R4 can be expanded. Therefore, generation of smoke can be curbed favorably.

In addition, in the embodiment described above, the scanning speed along the irradiation path of the electron beam B is uniform. When the scanning speed is uniform, a trajectory (gathering of dots) of the electron beam B as in FIG. 2 is realized. In this case, a uniform heat quantity is provided to the powder material A or the plate 31. When the plate 31 has a circular shape, heat is less likely to escape on the center side in the plate 31 than on the outer side. As a result, there is a possibility of occurrence of a temperature difference between the center side and the outer side in the plate 31. Hence, the scanning speed of the electron beam B may be changed in accordance with the position on the irradiation path. That is, the heat quantity to be provided to the powder material A or the plate 31 is controlled by controlling the scanning speed. In other words, the scanning speed is not limited to a uniform speed, and it may be changed in accordance with the position on the irradiation path. For example, in the irradiation path, the scanning speed on the inner side and the scanning speed on the outer side may differ from each other. More specifically, the scanning speed on the inner side of the plate 31 may be faster than the scanning speed on the outer side. In other words, the heat quantity may be curbed by increasing the scanning speed on the inner side of the plate 31, and the heat quantity to be provided may be increased by reducing the scanning speed on the outer side. As a result, a temperature distribution of the entire plate 31 having a circular shape can approximate to a more uniform distribution. For example, regarding the scanning speed of the electron beam B, the scanning speed on the irradiation path may be set by measuring a surface temperature of the powder material A or the plate 31 in advance based on a temperature distribution (measurement results). Moreover, control showing that the heat quantity is not provided may be performed by making the scanning speed extremely high, and control for providing a large quantity of heat may be performed by making the scanning speed extremely low. That is, preheating in which a large quantity of heat is provided to a part of the plate 31 or in the vicinity of a shaped article may be performed by setting an extreme change in scanning speed on irradiation path.

REFERENCE SIGNS LIST

1 Three-dimensional shaping device
2 Electron beam emitting unit
3 Shaping unit
4 Control unit
21 Electron gun portion
22 Convergent coil
23 Deflection coil
31 Plate
32 Elevator
33 Rake
34 Hopper
A Powder material
B Electron beam
R, R1, R2, R3, R4, R5, R6 Irradiation path
S3 Preliminary heating step

The invention claimed is:

1. A three-dimensional shaping device shaping a three-dimensional article by irradiating a powder material with an electron beam and melting the powder material, the three-dimensional shaping device comprising:
an electron beam emitting unit emitting the electron beam, melting the powder material in order to shape the article, and performing preliminary heating of the powder material by irradiating the powder material with the electron beam before the article is shaped; and
a circular-shaped plate for placing the powder material and supporting the article to be shaped, wherein
the electron beam emitting unit moves an irradiation position of the electron beam from a center of a circular irradiation region, which is located on the center side in the circular-shaped plate, toward an outer edge of the circular irradiation region, which is located on the outer side in the circular-shaped plate, in a spiral pattern and then return to the center of the circular irradiation region again, when the powder material is irradiated with the electron beam for preliminary heating,
the center of the circular irradiation region is located on the center side in the circular-shaped plate, and
the outer edge of the circular irradiation region is located on the outer side in the circular-shaped plate.

2. The three-dimensional shaping device according to claim 1,
wherein when irradiation of the electron beam is performed along a plurality of irradiation paths for preliminary heating, a path region in the vicinity of a start point of the irradiation paths is formed in a direction from an end point of a preceding irradiation region toward the start point.

3. The three-dimensional shaping device according to claim 1,
wherein the electron beam emitting unit performs preliminary heating of the circular-shaped plate by irradiating the circular-shaped plate with the electron beam in a spiral pattern before preliminary heating of the powder material is performed.

4. The three-dimensional shaping device according to claim 1, wherein the electron beam emitting unit moves the irradiation position along a plurality of spiral irradiation paths having concentric shapes.

* * * * *